United States Patent Office 3,520,892
Patented July 21, 1970

3,520,892
6-DEOXY-7,8-DIHYDROMORPHINE DERIVATIVES
Stephen I. Sallay, Wynnewood, and Scott J. Childress, Philadelphia, Pa., assignors to American Home Products Corporation, New York, N.Y., a corporation of Delaware
No Drawing. Filed Mar. 17, 1967, Ser. No. 623,840
Int. Cl. C07d 43/32
U.S. Cl. 260—285                                   9 Claims

ABSTRACT OF THE DISCLOSURE

The compounds of the class of 6-deoxy-7,8-dihydro-6-carbonylmethylenemorphine derivatives, useful as analgesics and antitussives, and the novel preparation thereof.

BACKGROUND OF THE INVENTION

This invention relates to new physiologically active 6-deoxy-7,8-dihydro-6-carbonylmethylenemorphine and 6-deoxy-7,8-dihydro-6-carbonylmethylene codeine derivatives and novel processes for their preparation.

Morphine and codeine derivatives are well-known to possess analgesic activities. 6-deoxy-6-fluoromorphine derivatives having analgesic activity have been described by D. E. Ayer in United States Pat. No. 3,137,701, issued June 16, 1964. 6-deoxy-14-hydroxy-7,8-dihydromorphine derivatives have been disclosed by J. Fishman in United States Pat. No. 3,162,639 to be useful as narcotic, analgesic and sedative agents.

SUMMARY OF THE INVENTION

More particularly, this invention relates to a compound of the formula

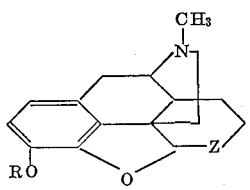

and the acid-addition salts thereof, wherein R is selected from the group consisting of hydrogen and methyl; and Z is selected from the group consisting of

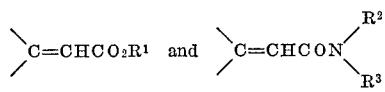

wherein $R^1$ is an alkyl group having less than 5 carbon atoms, and $R^2$ and $R^3$ are each selected from the group consisting of hydrogen and alkyl having less than 5 carbon atoms, or $R^2$ and $R^3$ together with the nitrogen to which they are joined is a monocyclic heterocyclic group containing from 4 to 6 carbon atoms.

Among the suitable acid-addition salts include inter alia, inorganic acids, such as the hydrohalic acids (e.g., hydrochloric and hydrobromic acids), sulphuric acid, nitric acid, and phosphoric acid, and organic acids, such as fumaric, tartaric, citric, acetic, maleic, succinic and the like.

The final products of this invention are physiologically active substances which are useful as analgesics and antitussives.

The compounds may be formulated for such administration, the concentration and/or dosage being based on the activity of the particular compound and the requirement of the patient. Hence, the compounds of this invention may be used as an analgesic in lieu of morphine.

DESCRIPTION OF THE PREFERRED EMBODIMENTS

The compounds of this invention may be prepared according to the process of this invention which may be represented by the following reaction scheme wherein $R^1$, and $R^2$ and $R^3$ are as hereinbefore defined:

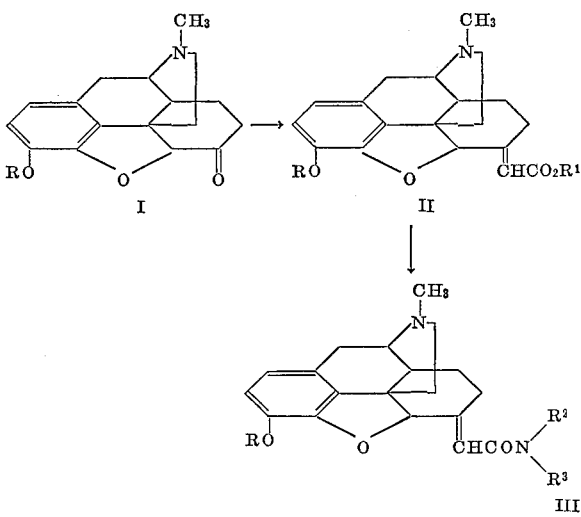

According to one feature of this invention, the dihydromorphinone compound of Formula I undergo a Wittig reaction to form one of the final products of the present invention, namely the 6-deoxy-7,8-dihydro-6-alkoxy-carbonylmethylenemorphine compounds of Formula II, that is, the dihydromorphinone compounds (I) or their alkali metal salts are treated with a trialkylphosphono ester in the presence of a basic catalyst to yield the compounds of Formula II.

The dihydromorphinone compounds (I) are known compounds which may be prepared by any conventional process, such as described by Knoll et al in German Pat. Nos. 365,683 and 617,238.

In accordance with another feature of this invention, the 6-deoxy-7,8-dihydro-6-alkoxycarbonylmethylenemorphine compounds (II) are treated with a nitrogen containing compound of the Formula (IV)

in a lower alkanol solvent, preferably in an autoclave at a temperature range about 100° to 130° C., to yield the 6-deoxy-7,8-dihydro-6-aminocarbonylmethylene morphine compounds of Formula III, which are additional final products of this invention.

Among the suitable compounds of Formula IV which are commercially available or may be prepared by conventional methods include ammonia; lower alkyl amine (e.g., methyl amine, ethyl amine); di(lower alkyl)amine (e.g., dimethylamine, diethylamine, methyl ethylamine); piperidine; pyrrolidine; morphine; and the like.

The following examples illustrate the invention (all temperatures being in centigrade):

EXAMPLE 1

6-deoxy-7,8-dihydro-6-ethoxycarbonylmethylene codeine, hydrochloride 0.015 mole of triethylphosphonoethylacetate in 10 ml. of monoglyme (freshly distilled from LiAlH₄) is slowly added to a suspension of 0.015 mole of sodium hydride which is suspended and stirred in 25 ml. of monoglyme for 1 hour at a temperature below +35° C. 0.015 mole of dihydrocodeinone is then dissolved in 100 ml. of monoglyme and added at once to the reaction mixture and stirred for 3 hours. The reaction mixture is then diluted with icy-water (200 ml.) and extracted with ether. The ethereal extraction is dried and evaporated. The waxy residue refluxed for 1 hour with hydroxylamine acetate in methanol. The solvent is evaporated in vacuo and the residue is dissolved in chloroform and chromatographed on basic alumina column. The unreacted dihydrocodeinone remained on the column as its oxime. Chloroform eluated 6-deoxy-7,8-dihydro - 6 - ethoxycarbonylmethylene codeine, which was transformed into its hydrochloride by addition of ethanolic hydrogen chloride; M.P. 242–244°.

Similarly, by following the procedure of Example 1, but substituting a different inorganic acid or an organic acid for hydrochloric acid, the corresponding acid-addition salt may be obtained.

EXAMPLE 2

6-deoxy-7,8-dihydro-6-ethoxycarbonylmethylene morphine, hydrochloride

Following the procedure of Example 1, but substituting the sodium salt of dihydromorphinone for dihydrocodeinone there is obtained 6-dioxy-7,8-dihydro-6-ethoxycarbonylmethylene morphine, hydrochloride.

EXAMPLE 3

6-deoxy-7,8-dihydro-6-methoxycarbonylmethylene codeine, hydrochloride

Following the procedure of Example 1, but substituting trimethylphosphonomethylacetate for triethylphosphonoethyl acetate there is obtained 6-deoxy-7,8-dihydro-6-methoxycarbonylmethylene codeine, hydrochloride.

EXAMPLE 4

6-deoxy-7,8-dihydro-6-carbamoylmethylene codeine

.01 mole of 6-deoxy-7,8-dihydro-6-ethoxycarbonylmethylene codeine is dissolved in 25 ml. of ethanol and added to 350 ml. of liquid ammonia. The mixture is then heated in an autoclave at 100–130° for about 5 hours, the solvent is evaporated and the residue dissolved in chloroform and chromatographed in a basic alumina column. The eluate yields 6-deoxy-7,8-dihydro-6-carbamoylmethylene codeine.

Similarly by following the procedure of Example 4, but substituting 6-deoxy-7,8-dihydro-6-methoxycarbonylmethylene codeine there is also obtained 6-deoxy-7,8-dihydro-6-carbonylmethylene codeine.

Treatment of the 6-deoxy-7,8 - dihydro - 6 - carbonylmethylene codeine with alcoholic hydrogen chloride results in the hydrochloride salt.

EXAMPLE 5

6-deoxy-7,8-dihydro-6-carbamoylmethylene morphine

Following the procedure of Example 4, but substituting 6-deoxy - 7,8 - dihydro-6-ethoxycarbonylmethylene morphine for 6-deoxy - 7,8 - dihydro-6-ethoxycarbonylmethylene codeine there is obtained 6-deoxy-7,8-dihydro-6-carbamoylmethylene morphine.

EXAMPLE 6

6-deoxy-7,8-dihydro-6-ethylcarbamoylmethylene codeine 0.01 mole of 6-deoxy - 7,8 - dihydro-6-ethoxycarbonylmethylene codeine and 0.015 mole of ethylamine is dissolved in 25 ml. of ethanol and heated in an autoclave about 120° C. for 2 hours.

The reaction mixture is cooled, the solvent is evaporated in vacuo, the residue is dissolved in chloroform and chromatographed on a basic alumina column. The eluate yields 6 - deoxy - 7,8-dihydro-6-ethylcarbbamoylmethylene codeine.

EXAMPLE 7

6-deoxy-7,8-dihydro-6-dimethylcarbamoylmethylene codeine

Following the procedure of Example 6, but substituting dimethylamine for ethylamine there is obtained 6-deoxy-7,8 - dihydro - 6 - dimethylcarbamoylmethylene codeine.

EXAMPLE 8

6-deoxy-7,8-dihydro-6-diethylcarbamoylmethylene codeine

Following the procedure of Example 6, but substituting diethylamine for ethylamine there is obtained 6-deoxy - 7,8 - dihydro - 6 - diethyl-carbamoylmethylene codiene.

EXAMPLE 9

6-deoxy-7,8-dihydro-6-pyrrolidinocarbonylmethylene codeine

Following the procedure of Example 6, but substituting pyrrolidine for ethylamine there is obtained 6-deoxy-7,8 - dihydro-6-pyrrolidinocarbonylmethylene codeine.

EXAMPLE 10

6-deoxy-7,8-dihydro-6-morpholinocarbonylmethylene codeine

Following the procedure of Example 6, but substituting morphine for ethylamine, there is obtained 6-deoxy-7,8 - dihydro - 6 - morpholinocarbonylmethylene codeine.

EXAMPLE 11

6-deoxy-7,8-dihydro-6-ethylcarbamoylmethylene morphine

Following the procedure of Example 6, but substituting 6-deoxy - 7,8 - dihydro-6-ethoxycarbonylmethylene morphine for 6-deoxy - 7,8 - dihydro-6-ethoxycarbonylmethylene codeine there is obtained 6-deoxy-7,8-dihydro-6-ethylcarbamoylmethylene morphine.

The invention may be variously otherwise embodied within the scope of the appended claims.

What is claimed is:

1. A compound selected from the group consisting of

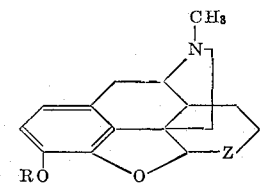

and the pharmaceutically acceptable acid-addition salts thereof, wherein R is selected from the group consisting of hydrogen and methyl; and Z is selected from the group consisting of

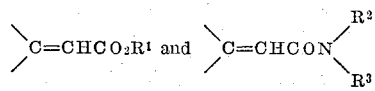

wherein $R^1$ is an alkyl group of less than 5 carbon atoms, and $R^2$ and $R^3$ are each selected from the group consisting of hydrogen and alkyl of less than 5 carbon atoms, and $R^2$ and $R^3$ together with the nitrogen to which they are joined is morpholino or pyrrolidino.

2. A compound according to claim 1 that is the pharmaceutically acceptable acid-addition salt of 6-deoxy-7,8-dihydro-6-ethoxy-carbonylmethylene codeine.

3. A compound according to claim 1 that is 6-deoxy-7,8-dihydro-6-methoxycarbonylmethylene codeine.

4. A compound according to claim 1 that is 6-deoxy-7,8-dihydro-6-ethoxycarbonylmethylene codeine.

5. A compound according to claim 1 that is 6-deoxy-7,8-dihydro-6-carbamoylmethylene codeine.

6. A compound according to claim 1 that is 6-deoxy-7,8-dihydro-6-carbamoylmethylene morphine.

7. A compound according to claim 1 that is 6-deoxy-7,8-dihydro-6-ethylcarbamoylmethylene codeine.

8. A compound according to claim 1 that is 6-deoxy-7,8-dihydro-6-ethylcarbamoylmethylene morphine.

9. A compound according to claim 1 that is 6-deoxy-7,8-dihydro-6-ethoxycarbonylmethylene morphine.

References Cited

UNITED STATES PATENTS 3,464,994   9/1969   Bentley et al. _____ 260—285

FOREIGN PATENTS 19,339   8/1965   Japan.

DONALD G. DAUS, Primary Examiner

U.S. Cl. X.R.
260—247.5, 999